United States Patent
Matsuda et al.

(10) Patent No.: US 8,648,576 B2
(45) Date of Patent: Feb. 11, 2014

(54) REACTIVE POWER COMPENSATOR

(75) Inventors: Akihiro Matsuda, Tokyo (JP); Yoshiyuki Kono, Tokyo (JP); Masatoshi Takeda, Osaka (JP)

(73) Assignee: Mitsubishi Electric Corporation, Chiyoda-Ku, Tokyo (JP)

( * ) Notice: Subject to any disclaimer, the term of this patent is extended or adjusted under 35 U.S.C. 154(b) by 311 days.

(21) Appl. No.: 13/167,926

(22) Filed: Jun. 24, 2011

(65) Prior Publication Data

US 2012/0139506 A1    Jun. 7, 2012

(30) Foreign Application Priority Data

Dec. 6, 2010    (JP) ................................. 2010-271270

(51) Int. Cl.
G05F 1/70    (2006.01)

(52) U.S. Cl.
USPC ............................. 323/211; 307/74; 307/105

(58) Field of Classification Search
USPC ............ 323/207–211, 205; 307/102, 105, 69, 307/74

See application file for complete search history.

(56) References Cited

U.S. PATENT DOCUMENTS

| 4,472,674 A * | 9/1984 | Yano et al. ..................... 323/210 |
| 7,688,043 B2 | 3/2010 | Toki et al. |
| 2009/0001942 A1* | 1/2009 | Temma et al. ................. 323/211 |
| 2009/0128100 A1* | 5/2009 | Yasuda et al. ................. 323/205 |

FOREIGN PATENT DOCUMENTS

| JP | 4-333112 A | 11/1992 |
| JP | 2008-40733 A | 2/2008 |

* cited by examiner

*Primary Examiner* — Harry Behm

(74) *Attorney, Agent, or Firm* — Buchanan Ingersoll & Rooney PC

(57) ABSTRACT

A first SVC is connected to a first bus. A first SVC control unit controls the first SVC. A first fluctuation-component-voltage generating unit includes a voltage reference circuit that outputs a voltage reference value. A second SVC is connected to a second bus. A second SVC control unit controls the second SVC. A second fluctuation-component-voltage generating unit includes a first-order-lag control block with limiter that generates a comparative voltage that follows a bus voltage of the second bus with a predetermined time lag characteristic and is limited within a predetermined range. An impedance value XS1 of slope reactance of the first SVC is set smaller than impedance value XS2 of slope reactance of the second SVC.

7 Claims, 6 Drawing Sheets

REACTIVE POWER COMPENSATOR

BACKGROUND OF THE INVENTION

1. Field of the Invention

The present invention relates to a reactive power compensator including a static var compensator that compensates for reactive power to suppress voltage fluctuation in a power system.

2. Description of the Related Art

In the past, a reactive power compensator is used as one of control systems for stabilizing the voltage of a power system. The reactive power compensator includes a static var compensator (SVC) that compensates for reactive power with respect to voltage fluctuation in the power system and a reactive power controller that controls reactive power output by the SVC.

In some case, the reactive power compensator includes a phase modifying equipment connected to the power system in parallel to the SVC. The phase modifying equipment includes one of a static capacitor (SC) and a shunt reactor (ShR) or both. The phase modifying equipment can compensate for reactive power by closing or opening the power system via a breaker.

The SVC controls a switch formed by a semiconductor element and generates leading or lagging reactive power. The SVC can instantaneously and continuously control the reactive power. On the other hand, because the phase modifying equipment is connected to the power system via the breaker, the phase modifying equipment discontinuously limits the reactive power according to operation for turning on and off the breaker. However, an adjustment range of the reactive power can be set larger than that in operation by only the SVC.

In the past, the reactive power compensator does not perform control assuming sudden voltage fluctuation. The reactive power compensator is often operated in a state in which the SVC generates reactive power equivalent to most of the capacity of the SVC in the steady state. Therefore, if sudden voltage fluctuation occurs during disturbance of the power system in the state in which the SVC generates reactive power equivalent to most of the capacity of the SVC, in some case, the SVC cannot sufficiently generate reactive power necessary for suppressing the voltage fluctuation and cannot suppress the voltage fluctuation. Therefore, for example, a reactive power compensator disclosed in Japanese Patent Application Laid-open No. 2008-40733 allots reactive power to the phase modifying equipment to control reactive power output by the SVC during steady operation to near zero and performs control corresponding to occurrence of disturbance of the power system.

In Japanese Patent Application Laid-open No. H04-333112, when two SVCs are arranged close to each other, the operations of the SVCs are coordinated by calculating a current deviation of one SVC and inputting a result of the calculation to a control device of the other SVC to correct an output of the other SVC.

However, in the reactive power compensator in the past, for example, when the two SVCs are arranged close to each other, the respective SVCs quickly suppress voltage fluctuation of the power system. Therefore, in some case the SVCs cannot output proper reactive power. When the phase modifying equipment is further provided, for example, unnecessary closing or opening of the static capacitor or the shunt reactor occurs.

As an example of measures against the problem, in Japanese Patent Application Laid-open No. H04-333112, the operations of the two SVCs are balanced by performing control for calculating a current deviation of one SVC and inputting a result of the calculation to the control device of the other SVC to correct an output of the other SVC. However, in such a control method, it is necessary to provide, separately from the SVCs and the control device of the SVC, a control unit having a function of calculating a current deviation. Therefore, the configuration of the reactive power compensator is complicated.

SUMMARY OF THE INVENTION

It is an object of the present invention to at least partially solve the problems in the conventional technology.

In order to solve above-mentioned problems and to achieve the object, according to an aspect of the present invention, there is provided a reactive power compensator, the reactive power compensator including a first static var compensator that is connected to a first bus and generates reactive power according to voltage fluctuation in the first bus, a first reactive power controller that controls an output of the first static var compensator, a second static var compensator that is connected to a second bus connected to the first bus via a power transmission line and generates reactive power according to voltage fluctuation in the second bus, and a second reactive power controller that controls an output of the second static var compensator, wherein the first reactive power controller includes a first fluctuation-component-voltage generating unit that outputs a difference between a bus voltage of the first bus and a predetermined reference voltage, and a first reactive-power control unit that calculates, based on a difference obtained by subtracting a product of an impedance value of first slope reactance for determining an output change of the first static var compensator with respect to a change in the bus voltage of the first bus and a current value flowing to the first static var compensator from the output of the first fluctuation-component-voltage generating unit, reactive power that the first reactive-power control unit causes the first static var compensator to output, and the second reactive power controller includes a second fluctuation-component-voltage generating unit that generates a comparative voltage, which follows the bus voltage of the first bus with a predetermined time lag characteristic and is limited within a predetermined range, and outputs a difference between the comparative voltage and the bus voltage, and a second reactive-power control unit that determines an output change of the second static var compensator with respect to a change in a bus voltage of the second bus and calculates, based on a difference obtained by subtracting a product of an impedance value of second slope reactance larger than the impedance value of the first slope reactance and a current value flowing to the second static var compensator from the output of the second fluctuation-component-voltage generating unit, reactive power that the second reactive-power control unit causes the second static var compensator to output.

The above and other objects, features, advantages and technical and industrial significance of this invention will be better understood by reading the following detailed description of presently preferred embodiments of the invention, when considered in connection with the accompanying drawings.

DETAILED DESCRIPTION OF THE PREFERRED EMBODIMENTS

Exemplary embodiments of the present invention are explained in detail below with reference to the accompanying drawings. The present invention is not limited by the embodiments.

Figure 1:
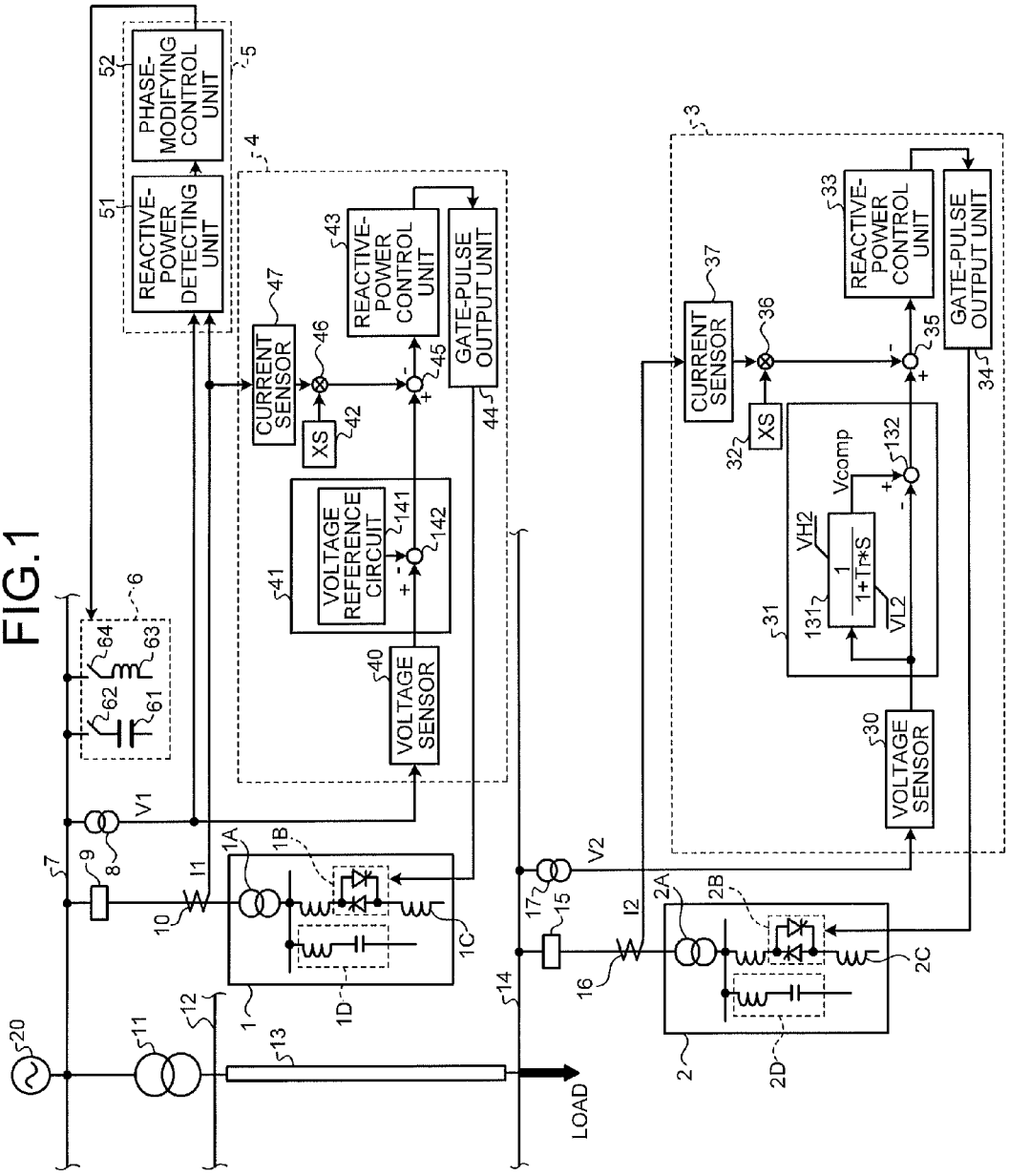
FIG. 1 is a block diagram of a configuration example of a reactive power compensator according to a first embodiment.

FIG. 1 is a block diagram of a configuration example of a reactive power compensator according to a first embodiment. As shown in FIG. 1, the reactive power compensator according to this embodiment includes a static var compensator (SVC) 1 (a first static var compensator) connected to a bus 7 (a first bus), which is a bus of a higher-order system, via a breaker 9, a potential transformer (PT) 8 that is connected to the bus 7 and measures the voltage of the bus 7, a current transformer (CT) 10 that is inserted between the breaker 9 and the SVC 1 and measures an electric current flowing to the SVC 1, an SVC control unit 4 (a first reactive power controller) that captures a voltage V1 detected by the PT 8 and an electric current I1 detected by the CT 10 and controls the voltage of the bus 7 via the SVC 1, a phase modifying equipment 6 connected to the bus 7, and a cooperative control unit 5 that controls, based on the voltage V1 and the electric current I1, closing or opening of the phase modifying equipment 6.

The reactive power compensator according to this embodiment further includes a static var compensator (SVC) 2 (a second static var compensator) connected to a bus 14 (a second bus), which is a bus of a lower-order system, via a breaker 15, a potential transformer (PT) 17 that is connected to the bus 14 and measures the voltage of the bus 14, a current transformer (CT) 16 that is inserted between the breaker 15 and the SVC 2 and measures an electric current flowing to the SVC 2, and an SVC control unit 3 (a second reactive power controller) that captures a voltage V2 detected by the PT 17 and an electric current I2 detected by the CT 16 and controls the voltage of the bus 14 via the SVC 2.

The SVCs 1 and 2 are static var compensators having different voltage classes. As explained above, the SVC 1 is connected to the higher-order system and the SVC 2 is connected to the lower-order system. The SVC 1 and the phase modifying equipment 6 are connected to the bus 7 in parallel. Besides, a not-shown load is connected to the bus 7. Similarly, the SVC 2 and a load are connected to the bus 14 in parallel. The SVC 2 is arranged in, for example, a position near the SVC 1. In other words, the SVC 1 and the SVC 2 are set a short distance from each other. For example, the SVCs 1 and 2 are set in the same transformer substation. This embodiment can be effectively applied when the SVCs 1 and 2 are arranged close to each other and could affect each other. The short distance accurately means an electrically short distance. Impedance between the SVC 1 and the SVC 2 is small. In general, if the SVC 1 and the SVC 2 are physically arranged at a short distance, the SVC 1 and the SVC 2 are electrically arranged at a short distance as well. However, even if the SVC 1 and the SVC 2 are physically distant from each other, the SVC 1 and the SVC 2 could be electrically arranged at a short distance.

Capacitances and characteristics of the SVC 1 and the SVC 2 are, for example, different from each other. The capacitance of the SVC 1 is larger than the capacitance of the SVC 2. The SVC 1 can output larger reactive power than the SVC 2. A difference between the characteristics of the SVC 1 and the SVC 2, for example, a difference between slope characteristics is explained later.

An AC power supply 20 is connected to the bus 7 of the higher-order system. The bus 14 of the lower-order system is connected to the bus 7 of the higher-order system via a transformer 11 and a power transmission line 13. The transformer 11 drops the voltage of the bus 7, which is the voltage on the transformer first-order side to the voltage of the bus 14, which is the voltage on the transformer second-order side. A bus 12 is disposed between the transformer 11 and the power transmission line 13. The bus 12 is explained in a second embodiment.

The SVC 1 includes a transformer 1A, a switching circuit 1B, a reactor 10, and a filter 1D. The SVC 1 is a static var compensator employing a thyristor controlled reactor system. The SVC 1 on/off controls thyristors included in the switching circuit 1B to thereby control the magnitude of reactive power generated in the reactor 10. The filter 1D is originally inserted as means for removing noise caused by switching of the switching circuit 1B. However, the filter 1D includes a capacitor. The filter 1D itself has an ability to generate leading reactive power. Therefore, the filter 1D functions as control means for reactive power together with the reactor 10. In addition to the control means, control means employing a thyristor switched capacitor (TSC) system can be added.

The SVC control unit 4 includes a voltage sensor 40, a fluctuation-component-voltage generating unit 41, a current sensor 47, slope reactance 42, a multiplier 46, a subtracter 45, a reactive-power control unit 43, and a gate-pulse output unit 44. The SVC control unit 4 controls the SVC 1 to supply leading reactive power when a system voltage falls and supply lagging reactive power when the system voltage rises.

The voltage sensor 40 receives input of a voltage signal (an instantaneous value) of a bus voltage in the bus 7 measured by the PT 8. The voltage sensor 40 converts the voltage signal into a voltage signal (an effective value), which is a control target voltage, and outputs the voltage signal.

The current sensor 47 receives input of a current signal of an instantaneous value measured by the CT 10. The current sensor 47 converts the current signal into an effective value and outputs the current signal.

The fluctuation-component-voltage generating unit 41 (a first fluctuation-component-voltage generating unit) includes a voltage reference circuit 141 and a subtracter 142. The voltage reference circuit 141 outputs a voltage reference value. The subtracter 142 outputs a difference value (a fluctuation component voltage) between the voltage signal output by the voltage sensor 40 and the voltage reference value output by the voltage reference circuit. The reactive power output by the SVC 1 is controlled to coincide with a characteristic chart shown in FIG. 2.

The slope reactance 42 determines a slope characteristic that the voltage signal changes at a predetermined rate with respect to a change in the reactive power generated by the SVC 1. The multiplier 46 outputs a product of the current signal output by the current sensor 47 and an impedance value XS1 of the slope reactance 42.

The subtracter 45 outputs a difference obtained by subtracting the product of the current value output by the current sensor 47 and the impedance value XS1 of the slope reactance 42 from the fluctuation component voltage output by the fluctuation-component-voltage generating unit 41.

The reactive-power control unit 43 (a first reactive-power control unit) calculates a reactive power output value of the SVC 1 to reduce an output of the subtracter 45 to zero and outputs the reactive power output value. The reactive-power control unit 43 controls a bus voltage through the calculation of the reactive power output value. The gate-pulse output unit 44 generates a gate pulse signal to generate the calculated reactive power output value and outputs the gate pulse signal to the switching circuit 1B of the SVC 1. The SVC 1 generates reactive power according to the gate pulse signal.

The phase modifying equipment 6 includes a static capacitor 61 connected to the bus 7 via a breaker 62 and a shunt reactor 63 connected to the bus 7 via a breaker 64. The static capacitor 61 and the shunt reactor 63 are connected to the bus 7 in parallel to the SVC 1.

The cooperative control unit 5 includes a reactive-power detecting unit 51 that detects reactive power output by the SVC 1 and a phase-modifying control unit 52 that controls closing or opening of the phase modifying equipment 6 according to the detected reactive power. The reactive-power detecting unit 51 calculates, based on the voltage V1 detected by the PT 8 and the electric current I1 detected by the CT 10, reactive power (Qsvc) generated by the SVC 1 and outputs the reactive power. The phase-modifying control unit 52 determines whether the detected reactive power is within a predetermined range and controls, based on a result of the determination, closing or opening of the phase modifying equipment 6. Specifically, when the reactive power (Qsvc) generated by the SVC 1 deviates from the predetermined range, the phase-modifying control unit 52 performs operation for closing or opening of the phase modifying equipment 6 and controls the reactive power (Qsvc) generated by the SVC 1 to fall within the predetermined range. The predetermined range is a range specified by QC1<Qsvc<QL1. QC1 (<0) represents a predetermined value of leading reactive power. QL1(>0) represents a predetermined value of lagging reactive power. In other words, in the case of Qsvc>QL1, the phase-modifying control unit 52 controls lagging reactive power allotted to the phase modifying equipment 6 to increase. In the case of Qsvc<QC1, the phase-modifying control unit 52 controls leading reactive power allotted to the phase modifying equipment 6 to increase. The closing or opening operation for the phase modifying equipment 6 is performed after the voltage control by the SVC 1 changes to the steady state. The reactive power generated by the SVC 1 can be allotted to the phase modifying equipment 6.

The SVC 2 includes a transformer 2A, a switching circuit 2B, a reactor 2C, and a filter 2D. The SVC 2 is a static var compensator employing the thyristor controlled reactor system. The SVC 2 on/off controls thyristors included in the switching circuit 2B to thereby control the magnitude of reactive power generated in the reactor 2C. The filter 2D is originally inserted as means for removing noise caused by switching of the switching circuit 2B. However, the filter 2D includes a capacitor. The filter 2D itself has an ability to generate leading reactive power. Therefore, the filter 2D functions as control means for reactive power together with the reactor 2C. In addition to the control means, control means employing the thyristor switched capacitor (TSC) system can be added.

The SVC control unit 3 includes a voltage sensor 30, a fluctuation-component-voltage generating unit 31, a current sensor 37, slope reactance 32, a multiplier 36, a subtracter 35, a reactive-power control unit 33, and a gate-pulse output unit 34. The SVC control unit 3 controls the SVC 2 to supply leading reactive power when a system voltage falls and supply lagging reactive power when the system voltage rises.

The voltage sensor 30 receives input of a voltage signal (an instantaneous value) of a bus voltage in the bus 7 measured by the PT 17. The voltage sensor 30 converts the voltage signal into a voltage signal (an effective value), which is a control target voltage, and outputs the voltage signal.

The current sensor 37 receives input of a current signal of an instantaneous value measured by the CT 16. The current sensor 37 converts the current signal into an effective value and outputs the current signal.

The fluctuation-component-voltage generating unit 31 (a second fluctuation-component-voltage generating unit) includes a first-order-lag control block with limiter 131 and a subtracter 132. The first-order-lag control block with limiter 131 receives, as an input, the voltage signal output by the voltage sensor 30 and generates a comparison voltage Vcomp that follows the voltage signal with a predetermined time lag characteristic and is limited within a predetermined range (a range of VL2 to VH2). Specifically, the first-order-lag control block with limiter 131 is a low-pass filter having a time constant Tr. The first-order-lag control block with limiter 131 is added with a limit function to maintain an output voltage Vcomp at a value between an upper limit value VH2 and a lower limit value V2. The upper limit value VH2 and the lower limit value VL2 are set in advance to correspond respectively to an upper limit value and a lower limit value in a voltage fluctuation range (VL2≤V2≤VH2) in the steady state. The subtracter 132 outputs a difference value (a fluctuation component voltage) between an output of the first-order-lag control block with limiter 131 and an output of the voltage sensor 40.

The slope reactance 32 determines a slope characteristic that the voltage signal changes at a predetermined rate with respect to a change in the reactive power generated by the SVC 2. The multiplier 36 outputs a product of a current value output by the current sensor 37 and an impedance value XS2 of the slope reactance 32. In this embodiment, the impedance value XS2 is set as XS2>XS1. Specifically, the impedance value XS1 of the slope reactance 42 of the SVC control unit 4 of the higher-order system is smaller than the impedance value XS2 of the slope reactance 32 of the SVC control unit 3 of the lower-order system. Consequently, a rate of a change in output reactive energy of the SVC 1 to voltage fluctuation of the bus 7 is larger than a rate of a change in output reactive energy of the SVC 2 to voltage fluctuation of the bus 14.

The subtracter 35 outputs a difference obtained by subtracting the product of the current value output by the current sensor 37 and the impedance value XS2 of the slope reactance 32 from the fluctuation component voltage output by the fluctuation-component-voltage generating unit 31.

The reactive-power control unit 33 (a second reactive-power control unit) calculates a reactive power output value of the SVC 2 to reduce an output of the subtracter 35 to zero and outputs the reactive power output value. The reactive-power control unit 33 controls a bus voltage through the calculation of the reactive power output value. The gate-pulse output unit 34 generates a gate pulse signal to generate the calculated reactive power output value and outputs the gate pulse signal to the switching circuit 2B of the SVC 2. The SVC 2 generates reactive power according to the gate pulse signal.

Figure 3:
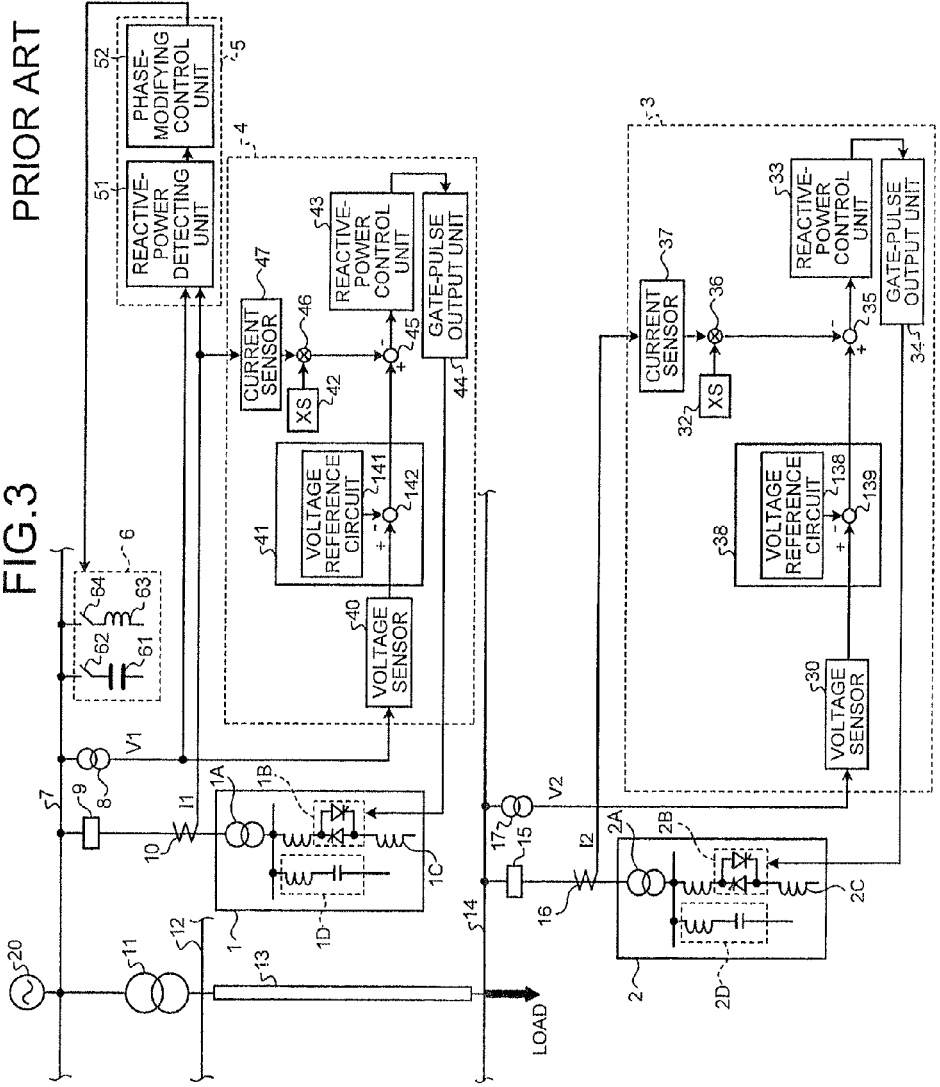
FIG. 3 is a block diagram of a configuration example of a reactive power compensator in the past.

The operation in this embodiment is explained in comparison with the operation of a reactive power compensator in the past. The configuration of the reactive power compensator in the past is shown in FIG. 3. As shown in FIG. 3, in the reactive power compensator in the past, only a part of components of the SVC control unit 3 connected to the lower-order system is different compared with this embodiment. Specifically, the configuration of a fluctuation-component-voltage generating unit 38 is different from the configuration of the fluctuation-component-voltage generating unit 31 in FIG. 1. Specifically, the fluctuation-component-voltage generating unit 38 includes a voltage reference circuit 138 and a subtracter 139. The configuration and the operation of the fluctuation-component-voltage generating unit 38 are the same as those of the fluctuation-component-voltage generating unit 41 of the SVC control unit 4 connected to the higher-order system. In FIG. 3, components same as those shown in FIG. 1 are denoted by the same reference numerals and signs. Detailed explanation of the components is omitted.

Figure 2:
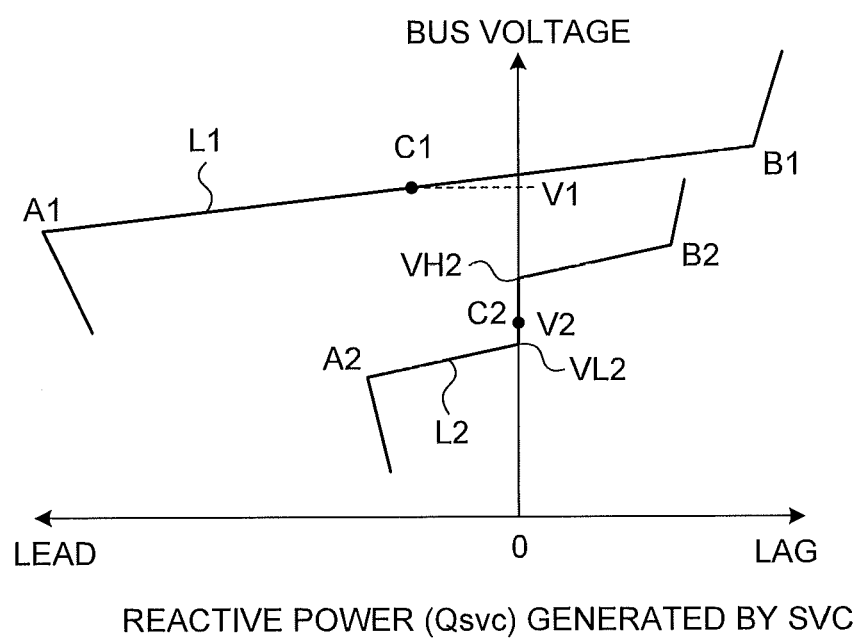
FIG. 2 is a characteristic chart of a relation between a bus voltage and reactive power generated by an SVC in the reactive power compensator according to the embodiment.
Figure 4:
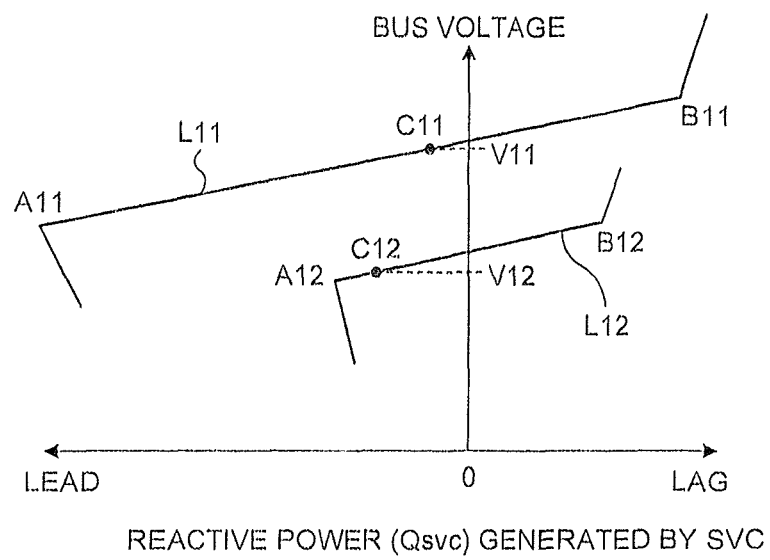
FIG. 4 is a characteristic chart of a relation between a bus voltage and reactive power generated by an SVC in the reactive power compensator in the past.

FIG. 2 is a characteristic chart of a relation between a bus voltage and reactive power generated by the SVC in this embodiment. FIG. 4 is a characteristic chart of a relation between a bus voltage and reactive power generated by the SVC in the reactive power compensator in the past.

First, the operation of the reactive power compensator in the past is explained with reference to FIGS. 4 and 3. In FIG. 4, the abscissa represents reactive power output by the SVC 1 or the SVC 2. A leading side is represented by minus and a lagging side is represented by plus. The ordinate represents the voltage of the bus 7 or the bus 14. This definition is the same in FIG. 2.

A characteristic line L11 indicates a relation between the voltage of the bus 7 and reactive power generated by the SVC 1 in the steady state. In the characteristic line L11, a control range of the SVC 1 is a range between A11 to B11. Reactive energy at A11 or B11 represents the capacitance of the SVC 1. C11 represents an example of an operating point of the SVC 1. At C11, the voltage of the bus 7 is V11. The SVC 1 generates, for example, leading reactive power. The characteristic line L11 between A11 and B11 is called a slope characteristic. The gradient of the characteristic line L11 depends on an impedance value XS11 of the slope reactance 42. As indicated by the characteristic line L11, in the control range of the SVC 1, the SVC 1 continuously outputs reactive power with respect to voltage fluctuation in the bus 7.

A characteristic line L12 indicates a relation between the voltage of the bus 14 and reactive power generated by the SVC 2 in the steady state. In the characteristic line L12, a control range of the SVC 2 is a range between A12 to B12. Reactive energy at A12 or B12 represents the capacitance of the SVC 2. It is seen that the capacitance of the SVC 2 is smaller than the capacitance of the SVC 1. C12 represents an example of an operating point of the SVC 2. At C12, the voltage of the bus 14 is V12. The SVC 2 generates, for example, leading reactive power. The characteristic line L12 between A12 and B12 is called a slope characteristic. The gradient of the characteristic line L12 depends on an impedance value XS12 of the slope reactance 32. In this case, the impedance value is set as XS12=XS11. The gradient of the characteristic line L12 in the control range of the SVC 2 is equal to the gradient of the characteristic line L11 in the control range of the SVC 1. As indicated by the characteristic line L12, in the control range of the SVC 2, the SVC 2 continuously outputs reactive power with respect to voltage fluctuation in the bus 14.

The reactive power at C11 is close to zero compared with the capacitance of the SVC 1. Reactive power output by the SVC 1 during a steady operation is around zero. In other words, in the steady state, the SVC 1 is in a state in which the SVC 1 generates very small reactive power compared with the capacitance of the SVC 1. Therefore, even if disturbance or the like occurs in the power system and the voltage of the bus 7 suddenly fluctuates, the SVC 1 can always operate and suppress steep voltage fluctuation. As shown in FIG. 3, the phase modifying equipment 6 is connected to the bus 7 and the SVC 1 and the phase modifying equipment 6 operate in cooperation with each other. Therefore, when reactive power output by the SVC 1 deviates from the control range of the SVC 1, the reactive power output by the SVC 1 can be set around zero by operating closing or opening of the phase modifying equipment 6. Therefore, for example, the SVC 1 operates at C11 again.

On the other hand, C12 is present around A12. Reactive power at C12 is not around zero. The SVC 2 generates reactive power close to the capacitance of the SVC 2. Therefore, when disturbance occurs in the power system, it is difficult for the SVC 2 to output reactive power to suppress steep voltage fluctuation in the power system. A control characteristic shown in FIG. 4 obtained when the two SVCs 1 and 2 are arranged close to each other is a general control characteristic in the reactive power compensator in the past.

The operation of this embodiment is explained with reference to FIGS. 2 and 1. A characteristic line L1 indicates a relation between the voltage of the bus 7 and reactive power generated by the SVC 1 in the steady state. In the characteristic line L1, a control range of the SVC 1 is a range between A1 and B1. Reactive energy at A1 or B1 represents the capacitance of the SVC 1. C1 represents an example of an operating point of the SVC 1. At C1, the voltage of the bus 7 is V1. The SVC 1 generates, for example, leading reactive power. The gradient of the characteristic line L1 between A1 and B1 depends on the impedance value XS1 of the slope reactance 42. As indicated by the characteristic line L1, in the control range of the SVC 1, the SVC 1 continuously output reactive power with respect to voltage fluctuation in the bus 7.

A characteristic line L2 indicates a relation between the voltage of the bus 14 and reactive power generated by the SVC 2 in the steady state. In the characteristic line L2, a voltage dead zone in which reactive power is not generated is provided. The voltage dead zone is provided in a range of a bus voltage VL2 to VH2 to correspond to the provision of the limiter (the upper limit is VH2 and the lower limit is VL2) in the fluctuation-component-voltage generating unit 31. In the characteristic line L2, a control range of the SVC 2 is a range of A2 to B2. Reactive energy at A2 or B2 represents the capacitance of the SVC 2. It is seen that the capacitance of the SVC 2 is smaller than the capacitance of the SVC 1. C2 represents an example of an operating point of the SVC 2. At C2, because the voltage of the bus 14 is V2 and is within the voltage dead zone, the SVC 2 does not generate reactive power. The provision of the voltage dead zone causes the SVC 1 to operate more preferentially than the SVC 2. This is because, for example, with respect to fluctuation in a bus voltage, the SVC 2 does not operate and the SVC 1 generates reactive power as long as the fluctuation is within the voltage dead zone. Because the voltage dead zone is provided, reactive power generated by the SVC 2 in the steady state is zero. The SVC 2 stays on standby in a state in which the SVC 2 can output reactive power equivalent to the capacitance of the SVC 2. Therefore, unlike the case shown in FIG. 4, even when disturbance occurs in the power system, the SVC 2 can suppress steep voltage fluctuation.

The gradient of the characteristic line L2 between A1 to B2 depends on the impedance value XS2 of the slope reactance 32. However, because the impedance value XS2 is set as XS2>XS1 as explained above, the gradient of the characteristic line L2 in the control range of the SVC 2 is larger than the gradient of the characteristic line L1 in the control range of the SVC 1. In FIG. 2, the gradient of the characteristic line L1 is drawn slightly smaller than the gradient of the characteristic line L2. When the impedance value XS1 of the slope reactance 42 of the SVC 1 is set smaller than the impedance value XS2 of the slope reactance 32 of the SVC 2, the SVC 1 can generate large reactive power with respect to small voltage fluctuation compared with the SVC 2. In other words, the SVC 1 generates reactive power more preferentially than the SVC 2.

As explained above, in FIG. 2, for example, even when the two SVCs 1 and 2 having different voltage classes and capacitances are arranged at a short distance, the SVC 1 can be caused to operate more preferentially than the SVC 2 because (a) the voltage dead zone is provided in the reactive power and bus voltage characteristic of the SVC 2 in the steady state and (b) the impedance value XS1 of the slope reactance 42 of the SVC 1 is set smaller than the impedance value XS2 of the slope reactance 32 of the SVC 2. It is possible to solve the problem in that the SVC 2 cannot suppress steep voltage fluctuation during disturbance of the power system.

Conditions for causing the SVC 1 to operate more preferentially than the SVC 2 include, besides (a) and (b) above, (c) a response of voltage control of the SVC 1 is set faster than a response of voltage control of the SVC 2. In other words, because responsiveness of the reactive-power control unit 43 to voltage fluctuation is set faster than responsiveness of the reactive-power control unit 33, the SVC 1 can more quickly generate reactive power than the SVC 2.

As explained above, according to this embodiment, for example, even when the SVCs 1 and 2 having different voltage classes and capacitances are arranged at a short distance from each other, for example, cooperative control for causing the SVC 1 having large capacitance connected to the higher-order system to preferentially operate is performed. This makes it possible to suppress reactive power output by the SVCs 1 and 2 in the steady state while controlling the voltages of the buses 7 and 14 within the set range and enable the SVCs 1 and 2 to deal with steep voltage fluctuation during disturbance of the power systems.

In this embodiment, when the cooperative control for causing the SVC 1 to preferentially operate is applied to the SVCs 1 and 2, it is unnecessary to exchange information such as operation states of the SVCs 1 and 2 between the SVC control units 3 and 4. Therefore, it is unnecessary to provide another (remote) control unit separately from the SVC control units 3 and 4 and the configuration is simplified. On the other hand, in Japanese Patent Application Laid-open No. H04-333112, when the two SVCs are arranged close to each other, a current deviation of one SVC is calculated and a result of the calculation is input to the control device of the other SVC to correct an output of the other SVC. Therefore, it is necessary to provide another control device having a current calculating function or the like besides the control device of the SVC. The configuration and the processing are complicated.

According to this embodiment, it is possible to appropriately control a voltage distribution of the entire power system and a phase modifying amount of reactive power.

Figure 5:
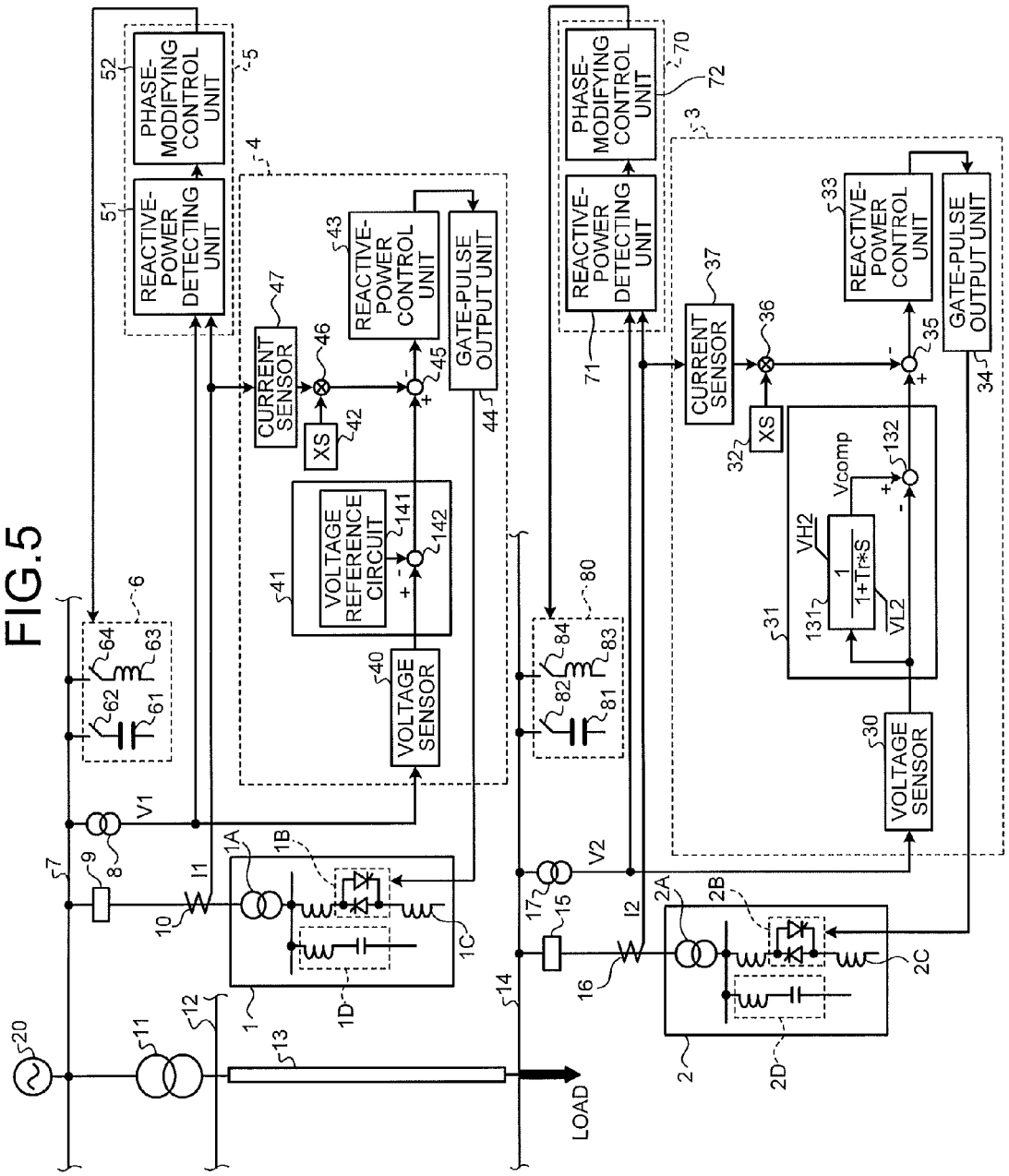
FIG. 5 is a block diagram of another configuration example of the reactive power compensator according to the first embodiment.

As shown in FIG. 1, in this embodiment, the phase modifying equipment 6 is connected to only the bus 7 of the higher-order system. However, as shown in FIG. 5, phase modifying equipment 80 can be connected to the bus 14 of the lower-order system as well. In FIG. 5, in addition to the components shown in FIG. 1, the phase modifying equipment 80 is provided in the bus 14 in parallel to the SVC 2. The phase modifying equipment 80 includes a static capacitor 81 connected to the bus 14 via a breaker 82 and a shunt reactor 83 connected to the bus 14 via a breaker 84. Further, a cooperative control unit 70 that controls opening or closing of the phase modifying equipment 80 is provided. The cooperative control unit 70 includes a reactive-power detecting unit 71 that detects reactive power output by the SVC 2 and a phase-modifying control unit 72 that controls closing or opening of the phase modifying equipment 80 according to the detected reactive power. The configuration and the operation of the cooperative control unit 70 is the same as the cooperative control unit 5. Therefore, explanation of the configuration and the operation is omitted.

In FIG. 1, it is also possible not to provide the phase modifying equipment 6 and the cooperative control unit 5. In this case, it is possible to obtain effects same as those in this embodiment. When reactive energy generated by the SVC 1 is around zero in the steady state, it is unnecessary to allot reactive power to the phase modifying equipment 6. Therefore, the phase modifying equipment 6 and the cooperative control unit 5 do not have to be provided.

Figure 6:
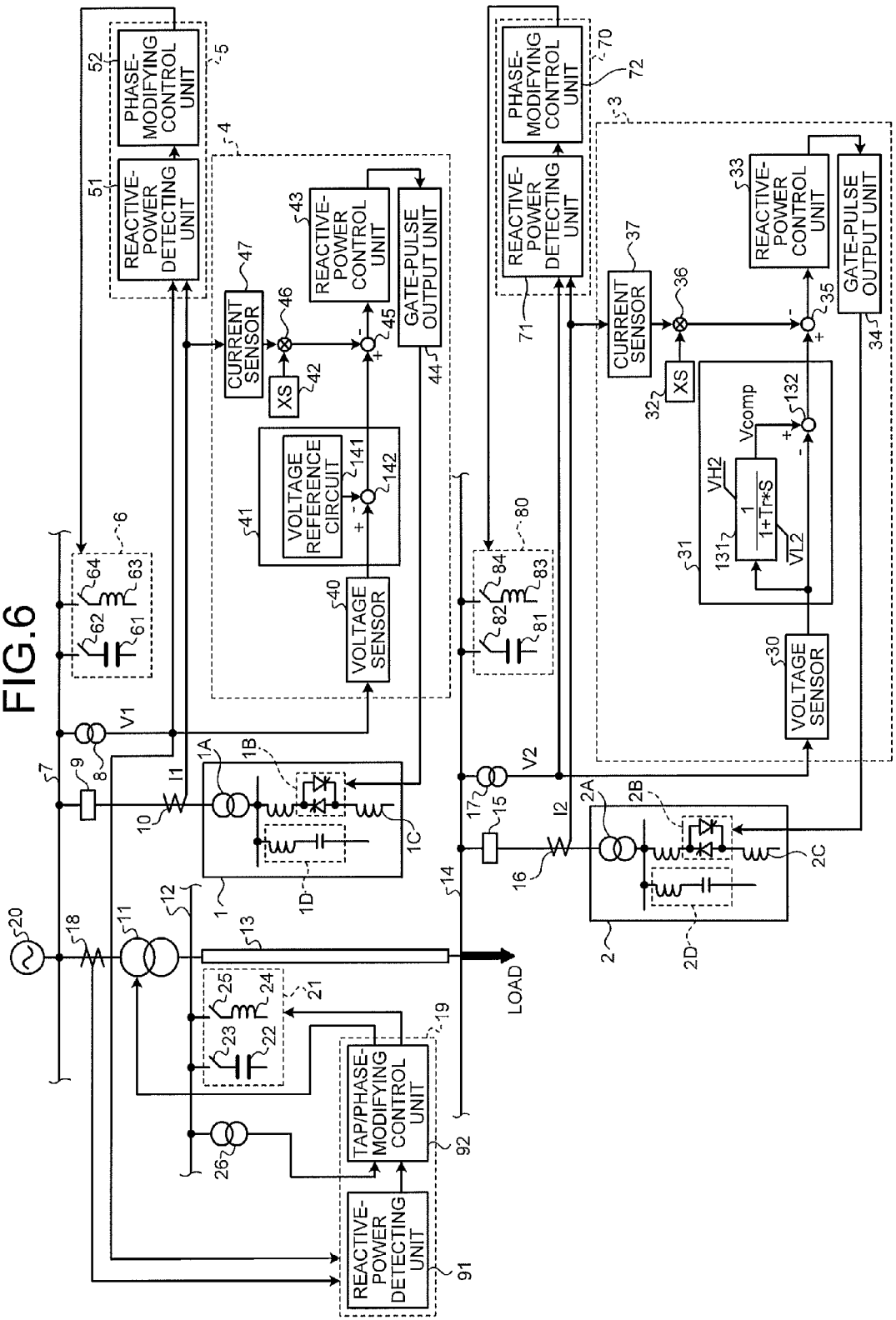
FIG. 6 is a block diagram of another configuration example of a reactive power compensator according to a second embodiment.

FIG. 6 is a block diagram of a configuration example of a reactive power compensator according to a second embodiment. Only differences from the configuration shown in FIG. 5 explained in the first embodiment are explained below. In FIG. 6, components same as those shown in FIG. 5 are denoted by the same reference numerals and signs. Detailed explanation of the components is omitted.

As shown in FIG. 6, a current transformer (CT) 18 is provided between the AC power supply 20 and the transformer 11. A potential transformer (PT) 26 and phase modifying equipment 21 are connected in parallel to each other to the bus 12 connected between the transformer 11 and the power transmission line 13. The phase modifying equipment 21 includes a static capacitor 22 connected to the bus 12 via a breaker 23 and a shunt reactor 24 connected to the bus 12 via a breaker 25. Further, a voltage Q (reactive power) control unit 19 connected to the CT 18, the PT 8, the PT 26, the transformer 11, and the phase modifying equipment 21 is provided. The voltage Q (reactive power) control unit 19 includes a reactive-power detecting unit 91 and a tap/phase-modifying control unit 92.

The reactive-power detecting unit 91 receives input of a current signal detected by the CT 18 and a voltage signal detected by the PT 8 and calculates, based on the input, reactive power.

The tap/phase-modifying control unit 92 receives input of reactive power output by the reactive-power detecting unit 91 and a voltage signal detected by the PT 26. Based on these input signals, to control reactive power on a first-order side of the transformer 11 (the higher-order system side) and a bus voltage (the voltage of the bus 14) on a second-order side of the transformer 11 (the lower-order system side) respectively to predetermined values, the tap/phase-modifying control unit 92 outputs a tap adjustment signal for adjusting a tap on the second-order side of the transformer 11 to the transformer 11 and outputs a closing/opening signal for operating closing or opening of the static capacitor 22 and the shunt reactor 24 to the phase modifying equipment 21.

The operation of the voltage Q (reactive power) control unit 19 is as explained below. The voltage Q (reactive power) control unit 19 monitors, with the reactive-power detecting unit 91, reactive power on the first-order side of the transformer 11 (the higher-order system side). The voltage Q (reactive power) control unit 19 can compensate for reactive power of the bus 7 by operating closing or opening of the phase modifying equipment 21. Reactive power is compensated in the bus 7 of the higher-order system as well with the reactive power compensated by the phase modifying equipment 21. However, for example, it is inefficient that the shunt reactor 63 is closed by the breaker 64 in the phase modifying equipment 6 of the higher-order system and the static capacitor 22 is closed by the breaker 23 in the phase modifying equipment 21 of the lower-order system. Therefore, the cooperative control unit 5 and the voltage Q (reactive power) control unit 19 need to cooperate with each other. The voltage Q (reactive power) control unit 19 monitors a voltage on the second-order side of the transformer 11 (the lower-order system side) according to a voltage signal from the PT 26. The voltage Q (reactive power) control unit 19 adjusts the tap on the second-order side of the transformer 11 with respect to voltage fluctuation in the bus 14 to suppress the voltage fluctuation. For example, when the voltage drops, the tap/phase-modifying control unit 92 outputs a tap adjustment signal for instructing to raise the tap on the second-order side of the transformer 11.

The relation between the bus voltage and the reactive power generated by the SVC shown in FIG. 2 holds in this embodiment as well. On the other hand, as explained above, in this embodiment, because the voltage Q (reactive power) control unit 19 is provided, the reactive power on the first-order side of the transformer 11 is compensated and electric power supplied from the higher-order system is stably controlled and voltage adjustment is performed to maintain the voltage on the second-order side of the transformer 11 constant with respect to bus voltage fluctuation due to, for example, fluctuation in a load of the bus 14. Therefore, voltage fluctuation width in the steady state of the bus 14 is limited. Consequently, in this embodiment, voltage dead zone width (a difference between VH2 and VL2) shown in FIG. 2 can be set smaller than that in the first embodiment. Even in this case, it is possible to apply the cooperative control for causing the SVC 1 to preferentially operate to the SVCs 1 and 2.

In this embodiment, because the phase modifying equipment 21 is provided, reactive power is compensated in the bus 7 of the higher-order system as well with the reactive power compensated by the phase modifying equipment 21. Consequently, there is an effect that it is possible to suppress a reactive power output of the SVC 1 in the steady state or reduce the number of times of operation of the phase modifying equipment 6 connected to the bus 7.

In this embodiment, the voltage Q (reactive power) control unit 19, the CT 18, the PT 26, and the phase modifying equipment 21 are added to the configuration shown in FIG. 5. However, it is also possible to add the voltage Q (reactive power) control unit 19 and the like to the configuration shown in FIG. 1 or add the voltage Q (reactive power) control unit 19 and the like to a configuration obtained by removing the phase modifying equipment 6 and the cooperative control unit 5 from the configuration shown in FIG. 1.

In the first and second embodiments, the two SVCs 1 and 2 having different voltage classes and capacitances are explained as an example. However, the first and second embodiments can be applied to other cases. For example, the first and second embodiments can be applied when voltage classes of the SVCs 1 and 2 are the same or the capacitances of the SVCS 1 and 2 are the same degree. As a specific example in which the voltage classes are the same, in the configuration shown in FIG. 1, another bus of a voltage class same as that of the bus 7 is connected to the bus 7 via a power transmission line and another SVC different from the SVC 1 is connected to the other bus. The first and second embodiments can also be applied when three or more SVCs are connected to one another at a short distance. In this case, one SVC caused to preferentially operate has a configuration same as that of the SVC 1. The other SVCs have a configuration same as that of the SVC 2. An impedance value of slope reactance of the one SVC caused to preferentially operate only has to be set smaller than that of the other SVCs.

According to the present invention, there is an effect that, when the first and second static var compensators are arranged at a short distance from each other, it is possible to control, with a simple configuration, the first and second static var compensators to cooperate with each other and it is possible to suppress outputs of the first and second static var compensators in the steady state and deal with voltage fluctuation during disturbance of the power system.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. A reactive power compensator comprising:
a first static var compensator that is connected to a first bus and generates reactive power according to voltage fluctuation in the first bus;
a first reactive power controller that controls an output of the first static var compensator;
a second static var compensator that is connected to a second bus connected to the first bus via a power transmission line and generates reactive power according to voltage fluctuation in the second bus; and
a second reactive power controller that controls an output of the second static var compensator, wherein
the first reactive power controller includes:
 a first fluctuation-component-voltage generating unit that outputs a difference between a bus voltage of the first bus and a predetermined reference voltage; and
 a first reactive-power control unit that calculates, based on a difference obtained by subtracting a product of an impedance value of first slope reactance for determining an output change of the first static var compensator with respect to a change in the bus voltage of the first bus and a current value flowing to the first static var compensator from the output of the first fluctuation-component-voltage generating unit, reactive power that the first reactive-power control unit causes the first static var compensator to output, and
the second reactive power controller includes:
 a second fluctuation-component-voltage generating unit that generates a comparative voltage, which follows the bus voltage of the second bus with a predetermined time lag characteristic and is limited within a predetermined range, and outputs a difference between the comparative voltage and the bus voltage of the second bus; and
 a second reactive-power control unit that calculates, based on a difference obtained by subtracting a product of an impedance value of second slope reactance for determining an output change of the second static var compensator with respect to a change in the bus voltage of the second bus and a current value flowing to the second static var compensator from the output of the second fluctuation-component-voltage generating unit, reactive power that the second reactive-power control unit causes the second static var compensator to output, and wherein the impedance value of the first slope reactance is smaller than the impedance value of the second slope reactance.

2. The reactive power compensator according to claim 1, wherein control responsiveness of the first reactive-power control unit is faster than control responsiveness of the second reactive-power control unit.

3. The reactive power compensator according to claim 1, wherein the first static var compensator is arranged in a position near the second static var compensator.

4. The reactive power compensator according to claim 1, wherein
the first bus is a bus of a higher-order system,
the second bus is a bus of a lower-order system, and
a capacitance of the first static var compensator is larger than a capacitance of the second static var compensator.

5. The reactive power compensator according to claim 1, further comprising phase modifying equipment for the first bus connected to the first bus to be capable of being closed or opened and having a static capacitor and a shunt reactor connected respectively to the first static var compensator in parallel.

6. The reactive power compensator according to claim 5, further comprising phase modifying equipment for the second bus connected to the second bus to be capable of being closed or opened and having a static capacitor and a shunt reactor connected respectively to the second static var compensator in parallel.

7. The reactive power compensator according to claim 5, wherein
the first bus is a bus of a higher-order system,
the second bus is a bus of a lower-order system,
a step-down transformer is provided between the first bus and the second bus,
in a third bus connected to a second-order side of the transformer, a phase modifying equipment for the third bus having a static capacitor and a shunt reactor connected respectively in parallel to the third bus is provided, and
a voltage-reactive-power control unit is provided that operates closing or opening of the phase modifying equipment for the third bus according to a detection value of reactive power on a first-order side of the transformer and adjusts a tap on the second-order side of the transformer according to a bus voltage on the second-order side of the transformer to thereby control the reactive power on the first-order side of the transformer and the bus voltage on the second-order side of the transformer respectively to predetermined values.

* * * * *